(12) United States Patent
Son et al.

(10) Patent No.: US 6,813,502 B2
(45) Date of Patent: Nov. 2, 2004

(54) SYSTEM AND METHOD FOR ENHANCED WIRELESS COMMUNICATION FEATURES

(75) Inventors: William Y. Son, San Diego, CA (US); Jong T. Chung, San Diego, CA (US)

(73) Assignee: Leap Wireless International, Inc., San Diego, CA (US)

(*) Notice: Subject to any disclaimer, the term of this patent is extended or adjusted under 35 U.S.C. 154(b) by 0 days.

(21) Appl. No.: 09/753,411

(22) Filed: Jan. 2, 2001

(65) Prior Publication Data

US 2001/0016500 A1 Aug. 23, 2001

Related U.S. Application Data

(62) Division of application No. 09/237,552, filed on Jan. 26, 1999, now abandoned.

(51) Int. Cl.[7] .............................. H04Q 7/20; H04M 3/42
(52) U.S. Cl. ................................ 455/456.3; 455/456.1
(58) Field of Search ........................... 455/456, 569, 455/553, 457, 422, 575, 414, 557, 90, 356.1, 356.3; 340/905, 988; 347/357.1, 357.13

(56) References Cited

U.S. PATENT DOCUMENTS

| | | | | |
|---|---|---|---|---|
| 5,517,683 A | * | 5/1996 | Collett et al. ................. 455/575 |
| 5,561,704 A | * | 10/1996 | Salimando ................... 455/456 |
| 5,712,899 A | * | 1/1998 | Pace, II ....................... 455/456 |
| 5,778,304 A | * | 7/1998 | Grube et al. ................. 455/422 |
| 5,786,789 A | * | 7/1998 | Janky ......................... 342/357.1 |
| 5,848,396 A | | 12/1998 | Gerace |
| 5,852,775 A | | 12/1998 | Hidary |
| 5,930,699 A | * | 7/1999 | Bhatia ......................... 455/414 |
| 5,991,735 A | | 11/1999 | Gerace |
| 5,999,126 A | * | 12/1999 | Ito ............................... 342/357.1 |
| 6,014,090 A | * | 1/2000 | Rosen et al. ................. 340/905 |
| 6,016,423 A | * | 1/2000 | Ross et al. ..................... 455/90 |
| 6,023,290 A | * | 2/2000 | Seita ............................ 348/118 |
| 6,028,537 A | * | 2/2000 | Suman et al. ................. 340/988 |
| 6,028,550 A | * | 2/2000 | Froeberg et al. .......... 342/357.13 |
| 6,029,069 A | * | 2/2000 | Takaki ......................... 455/456 |
| 6,029,072 A | * | 2/2000 | Barber ......................... 455/557 |
| 6,032,054 A | * | 2/2000 | Schwinke ..................... 455/557 |
| 6,049,711 A | * | 4/2000 | Ben-Yehezkel et al. ..... 455/456 |
| 6,050,898 A | | 4/2000 | Vange et al. |
| 6,055,510 A | | 4/2000 | Henrick et al. |
| 6,108,533 A | * | 8/2000 | Brohoff ........................ 455/414 |
| 6,113,494 A | | 9/2000 | Lennert |
| 6,134,532 A | | 10/2000 | Lazarus et al. |
| 6,157,841 A | | 12/2000 | Bolduc et al. |
| 6,181,927 B1 | | 1/2001 | Welling, Jr. et al. |
| 6,208,866 B1 | | 3/2001 | Rouhollahzadeh et al. |
| 6,216,129 B1 | | 4/2001 | Eldering |

(List continued on next page.)

FOREIGN PATENT DOCUMENTS

| | | |
|---|---|---|
| EP | 1066867 A2 | 1/2001 |
| EP | 1066868 A2 | 1/2001 |
| EP | 1086732 A1 | 3/2001 |
| EP | 1087323 A1 | 3/2001 |

*Primary Examiner*—Vivian Chin
*Assistant Examiner*—Raymond Persino
(74) *Attorney, Agent, or Firm*—Reed Smith LLP

(57) ABSTRACT

A wireless communication apparatus capable of providing information requests includes a wireless communication device having a wireless transceiver configured to send and receive communications across a wireless communication network. A hands-free unit can be included and coupled to the wireless communication device. The hands-free unit includes a speaker and a microphone configured to provide audio information to a user and to accept audio information from the user. A position determination system determines a location of the apparatus and provides position data indicative of such location to a server along with the information request. The server can process the information request along with the position information and provide a response to the request to the wireless communication apparatus.

5 Claims, 6 Drawing Sheets

U.S. PATENT DOCUMENTS

| | | |
|---|---|---|
| 6,223,291 B1 | 4/2001 | Puhl et al. |
| 6,256,498 B1 * | 7/2001 | Ludwig ...................... 455/456 |
| 6,349,203 B1 * | 2/2002 | Asaoka et al. .............. 455/456 |
| 6,356,761 B1 * | 3/2002 | Huttunen et al. ........... 455/456 |
| 6,535,743 B1 * | 3/2003 | Kennedy et al. ............ 455/456 |
| 2001/0005839 A1 | 6/2001 | Maenpaa et al. |
| 2001/0011248 A1 | 8/2001 | Himmel et al. |
| 2001/0013037 A1 | 8/2001 | Matsumoto |
| 2001/0014911 A1 | 8/2001 | Doi et al. |
| 2001/0044310 A1 * | 11/2001 | Lincke ....................... 455/456 |
| 2002/0068549 A1 * | 6/2002 | Tendler ...................... 455/456 |

* cited by examiner

| LOCATION INFORMATION REQUEST 404 | 1 BYTE |
|---|---|

RESPONSE 408

| TIME 410 | 6 BYTE |
|---|---|
| LONGITUDE 412 | 9 BYTES |
| LATITUDE 414 | 8 BYTES |
| HEIGHT 416 | 8 BYTES |
| SPEED 418 | 3 BYTES |
| DATA AGE 420 | 1 BYTE |

SYSTEM AND METHOD FOR ENHANCED WIRELESS COMMUNICATION FEATURES

This is a divisional of application Ser. No. 09/237,552, filed Jan. 26, 1999 now abandoned.

BACKGROUND OF THE INVENTION

1. Field of the Invention

The present invention relates generally to wireless communication devices and more specifically to a system and method for providing enhanced features in wireless communication systems.

2. Related Art

The advent of wireless personal communications devices has revolutionized the telecommunications industry. Cellular, PCS and other services provide wireless personal communications to businesses and individuals at home, in the office, on the road, and virtually anywhere the wireless network reaches. Wireless telephone subscribers no longer have to stop at pay telephones along the road, or wait until they return home or to the office to check messages and return important business calls. Instead, wireless subscribers carry out their day to day business from their cars, from the jobsite, while walking along the airport concourse, and just about anywhere their signals are accessible.

Thus, it is no surprise that since the introduction of the cellular telephone service, the number of wireless telephone subscribers has increased steadily. Today, the number of wireless telephone subscribers is staggering and still growing rapidly. In fact, many households have multiple wireless telephones in addition to their conventional land-line services.

With a market of this size, there is fierce competition among hardware manufacturers and service providers. In an attempt to lure customers, most providers offer handsets with desirable features or attributes such as small size, light weight, longer battery life, speed dial, and so forth. Many recent additions to the marketplace include multi-functional handsets that even provide pocket-organizer functions integrated into the wireless handset. Most manufacturers, however, are still scrambling to add new features to their communication devices to snare a portion of this booming market.

SUMMARY OF THE INVENTION

The present invention is directed toward a system and method for providing enhanced information to users of wireless communication devices. According one aspect of the invention, the information provided is in part based on position information obtained by the wireless communication device. According to one aspect of the invention, the wireless communication device includes a wireless device and a hands-free unit that can be operated in conjunction with one another to provide hands free operation of the wireless communication device.

A position determination system such as, for example, a GPS or other position determination device is included with the wireless communication device to enable the position of the device to be determined during operation. When a user requests information, the user's position as determined by the position determination device, along with the request are sent to a server via the wireless communication device. In one application, the wireless communication device actually places a data call to a server via the wireless communication network and sends the information request, along with the current location information, to the server.

The server utilizes this location information to retrieve requested information based on the user's current position. For example, the server may retrieve driving directions to a requested destination, information regarding facilities or services in the vicinity of the user, or other information that may be requested by the user. The information retrieved is returned to the user via the wireless network, again in the form of a data call. The information returned can be displayed or audibly provided to the user to fulfill the user's request. The user's request can be entered using voice commands, keystrokes or keypad input, or a combination thereof.

Where voice commands are utilized, speech recognition can be provided to convert the voice into data for transmission to the server. Alternatively, voice commands and voice responses can be provided as audio information (albeit in digital form for digital communication networks) and exchanged between the server and the wireless communication device. One feature and advantage of the invention is that where location information is useful or required to fulfill a request, the information can be automatically provided to the server fulfilling that request.

Additionally, in applications where the position determination device is provided with a hands-free unit 132, functionality can be provided as an add on to a user's existing wireless handset or other wireless communication device. As such, the user does not need to replace his or her handset or phone, he or she simply needs to add a hands-free unit with the position determining device.

BRIEF DESCRIPTION OF THE DRAWINGS

FIG. 6 is a diagram illustrating an example format for the location information request and a location information response according to one embodiment of the invention.

DETAILED DESCRIPTION OF THE PREFERRED EMBODIMENTS

1. Introduction and Overview

The present invention is directed toward a system and method for providing enhanced information features and services for wireless communication devices. According to one aspect of the invention, a position determination system is included with the wireless communication device to allow the location of the device to be determined. The location of the device can be used to provide additional information or features to a user of the wireless communication device. In one embodiment of this aspect of the invention, the positional or locational information of the wireless communication device can be used to retrieve information such as, for example, map information; driving information; location information; location of, retailers, goods, services, or other points of interest in the vicinity of the communication device; or other information that may be useful or valuable to a user of the communication device. In one implementation, the position information can be sent to a server at a remote location from the communication device. The server can access and compile requested information and provide the information back to the user via the wireless communication device.

According to another aspect of the invention, voice recognition and speech synthesis can be included to provide an enhanced user interface to the information system. This enhanced user interface can allow the acceptance of vocal commands by a user and provide vocal responses audible to the user. The voice recognition and speech synthesis can be provided in addition to and to complement the more conventional display and keypad interfaces commonly found on wireless communication devices.

2. Example Environment

Before describing the invention in detail, it is useful to describe a simple example environment in which the invention can be implemented. One such example environment is a wireless communication network such as, for example, a cellular, GSM, PCS, radio, or other wireless communication network or service. Handsets or communication devices used with such systems provide wireless communication services and often include a keypad for control and data entry of the device, as well as a display to provide information to the user regarding the communication or regarding information entered by the user on the keypad.

Wireless communication handsets or devices such as those that would benefit from the various features and aspects of the present invention, can be implemented in a number of different configurations with a number of different architectures. In fact, as will become apparent to one of ordinary skill in the art after reading this description, implementation of the features of the present invention is not dependent on a particular or specific architecture of the communication device or communication network. However, to provide a backdrop for the description of the features, an example wireless communication device is described with reference to FIG. 1.

Figure 1:
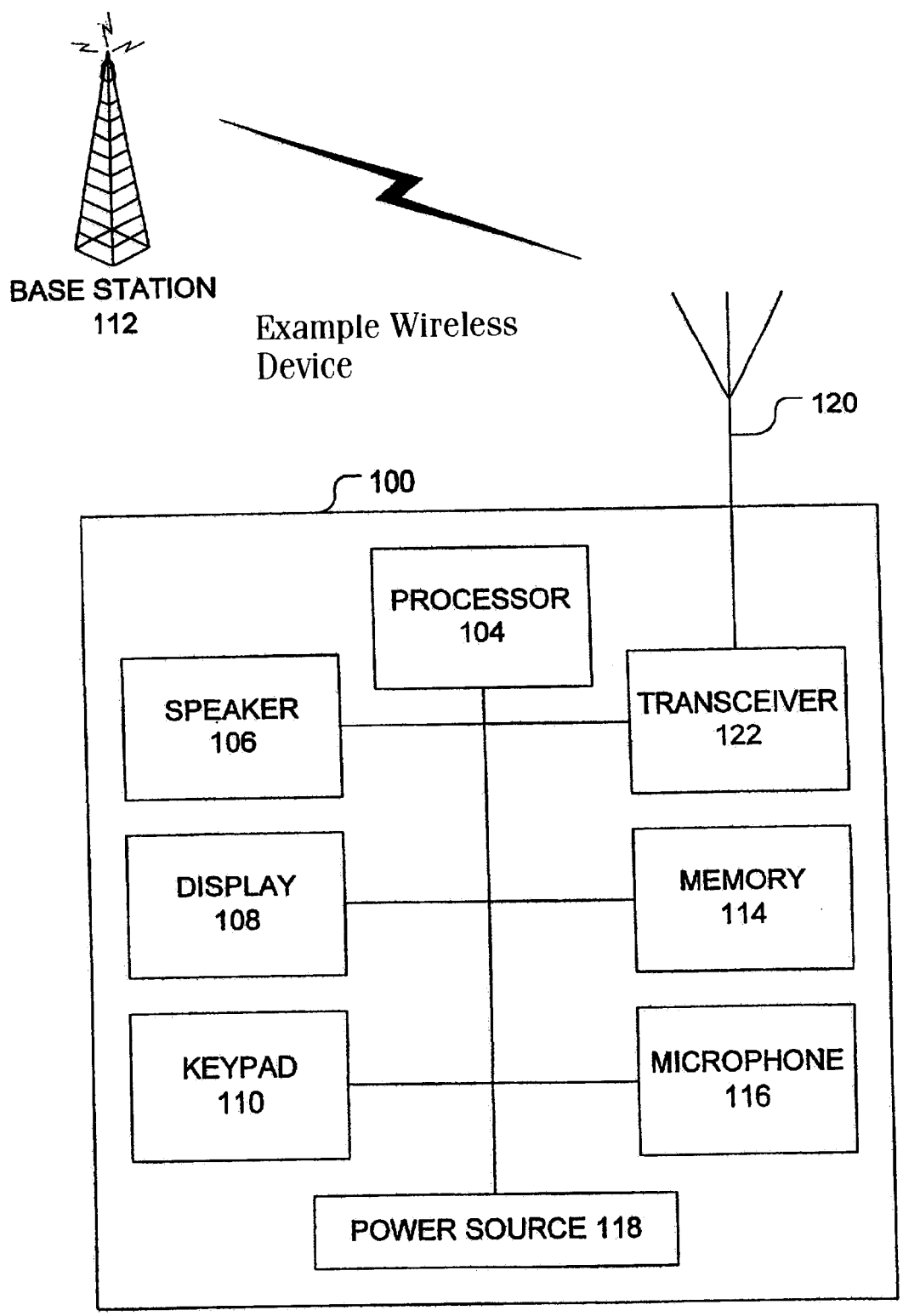
FIG. 1 is a diagram illustrating an example wireless communication device.

Referring now to FIG. 1, the wireless communication device 100 includes a processor 104, a speaker 106, a display 108, a keypad 110, a transceiver 112, a memory 114, a microphone 116, a power source 118 and an antennae 120. Wireless communication device 100 can be a handheld handset, integrated vehicle phone or other preferably wireless communication device configured to communicate with other communications devices such as, for example, a base station 112 or other communication device. Contemporary communication handsets typically include one or more processors 104 to control the operation and the features of the handset. Processor 104 typically has associated therewith computer program code running on the processor to carry out the functionality of the device.

Memory 114 such as RAM, ROM, or other memory, can be included and interfaced with the processor to store the program code and to provide other storage space for data or other information useful in executing the program code as well as in carrying out functions of the handset. In fact, the features and functionality of the present invention can be implemented using hardware, software, or a combination thereof, and such software can run on a processor such as processor 104.

Communication handsets 100 typically also include a transceiver 122. Transceiver 112 provides a transmitter to transmit voice and data information via antenna 120 to a recipient communication device such as, for example, base station 112. Transceiver 112 typically also includes a receiver to receive voice and data communication from another communication device (e.g., base station 112) and to provide the received voice and data information to the user or to facilitate internal functionality of the handset.

User interface portions of the typical wireless communication handset 100 include a speaker 106, a display 108, a keypad 110, and a microphone 116. Microphone 116 accepts voice or other audio information from the user, converts this information to electrical signals such that they can be transmitted by the transceiver to a recipient. Likewise, speaker 106 converts electrical signals received by transceiver 112 into audio information that can be heard by a user of the wireless communication device 100. Display 108 can be used to display information to the user such as, for example, call information, keypad entry display, signal presence and signal strength display, battery life display, or any other information useful to the user. Display 108 can include any type of display, but is preferably a liquid crystal display (LCD) due to the LCD's low power consumption characteristics. Display 108 can also include other visual displays such as, for example, light emitting diode (LED) indicators or other visual indicators.

Keypad 110 can be implemented using a numeric or an alphanumeric keypad and can also include special function keys. In one embodiment, keypad 110 includes back lighting such that information on the keys can be viewed by the user in low light or dark conditions. Many electronic devices including wireless communication devices include a flip panel (not illustrated) that can be closed to conceal some or all of the keys on the keypad.

Power source 118 is used to provide power to one or more of the components of the wireless communication handset 100. Power source 118 can be implemented, for example, using rechargeable batteries such as NiCad or NiMH rechargeable batteries. Other power sources can be included in addition to or in place of batteries.

The invention is described herein in terms of this example environment. Description in these terms is provided for ease of discussion only. After reading the description herein, it will become apparent to one of ordinary skill in the art that the present invention can be implemented in any of a number of different communication devices where it is desirable to obtain information based on or somewhat related to the location of the device.

3. Enhanced Device Features

The present invention provides several features and aspects that can be included with one or more wireless communication devices such as, for example, wireless telephones described above with reference to FIG. 1. These features and aspects can be implemented individually or collectively to provide enhanced functionality to the users. One such feature provides information to a user of a wireless communication device based on the location of the user and his or her device.

Figure 2:
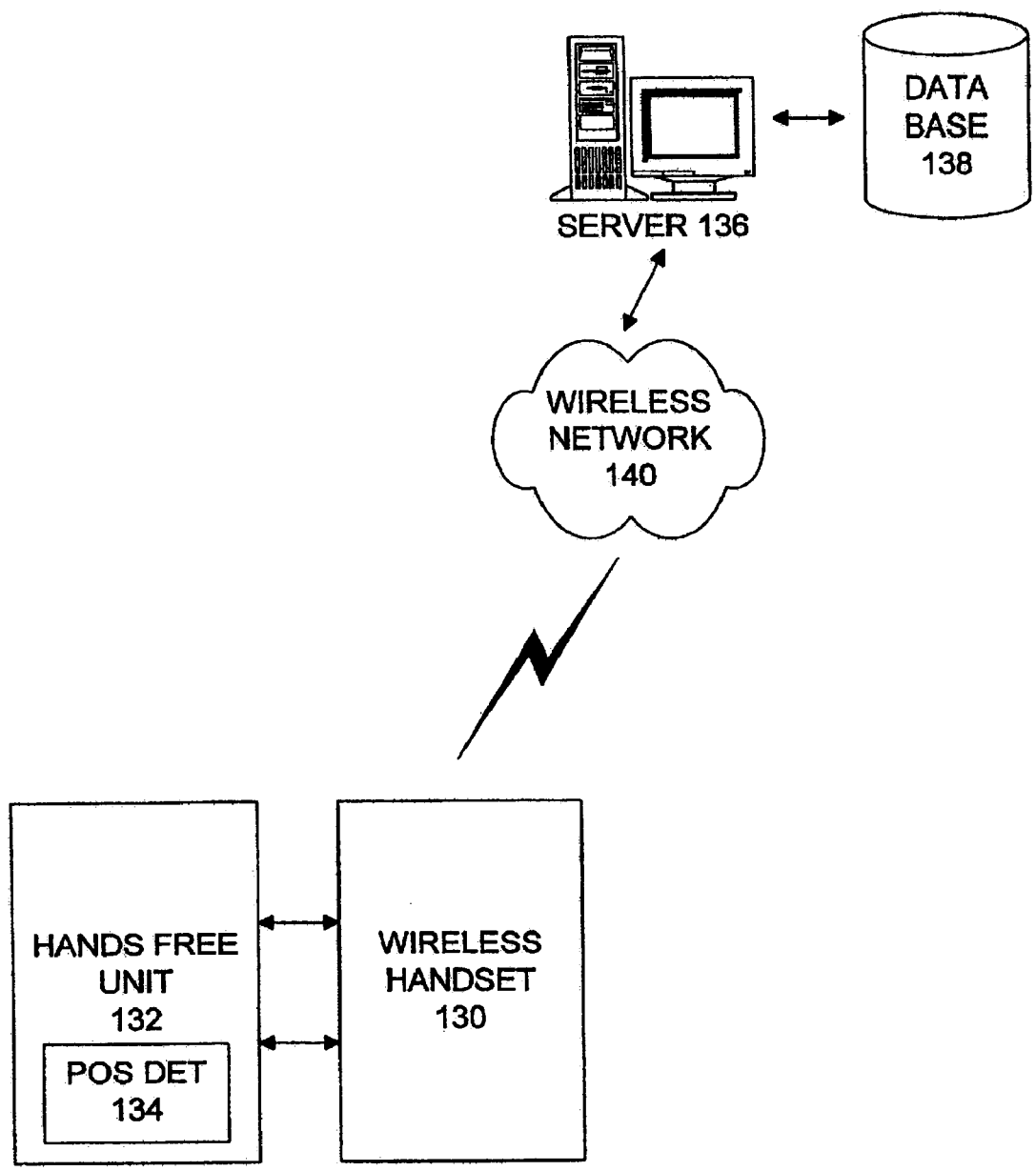
FIG. 2 is a block diagram illustrating a functional architecture that can be implemented to provide such information to the user according to one embodiment of the invention.

FIG. 2 is a block diagram illustrating a functional architecture that can be implemented to provide such information to the user according to one embodiment of the invention. Referring now to FIG. 2, the wireless communication system includes a wireless device 130 and a hands-free kit 132. Wireless device 130 can be implemented using, for example, the wireless communication device 100 illustrated in FIG. 1, or any other wireless communication device capable of communicating to remote locations via a wireless communication medium.

Hands-free unit 132 can be provided to allow the user of wireless device 130 to communicate in a hands free mode. Typically, hands-free unit 132 can include a microphone and speaker to provide speakerphone-like capabilities to wireless device 130. Such capabilities are particularly desirable where wireless device 130 is utilized in an automobile or other mobile situation. In one embodiment, hands-free unit 132 can be designed and implemented according to conventional industry standards for what is known as a "hands-free kit." In addition to these conventional standards, however, the illustrated embodiment includes a position determination system 134 with hands-free unit 132. Position determination system 134 included with hands-free unit 132 allows for the determination of locational information of the hands-free unit and the wireless device 130 associated therewith. Position determination system 134 can determine the device's position in terms of usable coordinates such as, for example, latitude, longitude, height, speed of travel, or other useful locational or positional parameters. Additionally, the position determination functionality can be incorporated into wireless device 130 as opposed to hands-free unit 132.

In one embodiment, position determination system 134 can be implemented using a GPS (global positioning system) or differential GPS system. As would be apparent to one of ordinary skill in the art after reading this description, alternative position determination systems can be utilized and combined with hands-free unit 132.

In another embodiment, the position determining device, instead of using a navigation system such as GPS, uses a signal of the wireless device itself in communication with two or more base stations to triangulate and get a fix on the position of the wireless device 130. Although useful and perhaps less expensive than including a GPS or other location determination receiver, such techniques may suffer from one or two weaknesses such as, for example, errors due to multipath signal transmission or inoperability in areas where only one base station is available. Also, where only two base stations are available, ambiguities may need to be resolved.

Because in the embodiment illustrated in FIG. 2, position determination device 134 is located in hands-free unit 132, it is desirable that wireless device 130 include both a voice and data interface. The voice interface allows hands free operation or speakerphone-like capabilities. The data interface provides an interface for position information such as that obtained by position determination system 134 such that the information can be received by wireless device 130 and provided to wireless network 140. Additionally, as discussed below, in embodiments where voice recognition or speech synthesis are utilized and where they are provided in hands-free unit 132, such a data interface can be used to provide the data to be synthesized into speech or the data received via the voice recognition.

Wireless device 130 communicates with other users, PSTN users, the central office, and other entities and parties via a wireless network 140. Wireless network 140 is typically made up of a plurality of base stations (such as, for example, base station 112) that provide a relay point or points for the communication. In the embodiment illustrated in FIG. 2, wireless device 130 can also use wireless network 140 to access a data server 136. In this embodiment, data server 136 can use locational information provided by the wireless device 130 to retrieve and provide useful information to the user based on the positional information.

Wireless network 140 can be a network such as, for example, a cellular network, a PCS network, a GSM network, or any communication network across which a wireless device 130 can access a data system such as server 136 with its associated one or more databases 138. In operation, when a user requests information, the position information is provided by a wireless device 130 to server 136 across wireless network 140. Server 136 retrieves data pertaining to the request based on the positional information. The retrieved data is returned via wireless network 140 to wireless device 130. This information can be displayed to the user on a display or audibly rendered to the user via, for example, speech synthesis or prerecorded scripts.

Although the types of information that can be stored in database 138 and provided to a user upon request can be virtually limitless, a few examples are provided to better illustrate one or more applications for the invention. In one application, for example, a user may wish to obtain driving directions to a particular business, home, or other location. The user makes the request either via keypad entry or voice commands or a combination of both, and the request is provided to server 136 via wireless network 140. Because driving directions typically utilize a starting point, the positional information determined at the time of the request is provided to server 136 via wireless network 140 to provide a starting point from which to give the driving directions.

Server 136 utilizes the starting address determined by the positional information and the destination address provided by the user and calculates a route and compiles driving directions that reflect that route. The driving directions can be provided to the user over wireless network 140 such that they can be displayed on a display device and audible commands can be provide over a speaker of wireless device 130 or hands-free unit 132. In addition to step-by-step driving directions, a map can be displayed on the display of wireless device 130 to provide visual cues and information to the user.

The user may be given options, such as, for example, selecting shortest possible route, limiting the route to highways, allowing the route to include secondary roads, avoiding bad neighborhoods or areas with high crime rates, and so on. The user's choice of options may then dictate how the route is calculated and determined. The options may be stored and prompts or scripts generated locally, or they may be defined at server 136, and the prompts or scripts provided to the user via network 140.

In another example application, a user may wish to locate a particular type of facility in the vicinity of his or her current location. For example, the user may wish to find a list of eating establishments, gas stations, hotels, or other facilities or services that may be within the user's current vicinity. Again, the user can provide this request vocally or via keypad entry to server 136 across wireless network 140. Server 136 can use the user's current position as determined by the position determination device 134 and provided to server 136 to determine the facilities or services of the nature requested located in the user's vicinity.

The user may request the application of parameter limits or filters to refine the request and the selections returned. For example, the user may enter a locational filter, for example, requiring the returned selections be within X miles of the user's current position. Additionally, if the user is seeking, for example, an eating establishment, the user may request or may be prompted to request a particular type of food (e.g., Italian, French, American, etc.), a particular price range, a class of establishment (e.g., fast food, casual dining, formal, elegant, etc.) or other parameters that can further define classes to assist in the search for a location. As another example, in searching for a gas station, hotel, or motel, the user may request a particular chain or brand that most suits his or her preference.

Again, such requests can be made, depending on the application, on the user's own initiative or based on prompting of the system to the user. For example, if the user enters a request to find a nearby eating establishment, the system may reply with a prompt asking questions such as proximity, type of food, type of establishment or other parameters such as, for example, those just described above. The user may reply to these prompts to allow server 136 to refine its search.

In one embodiment, this prompting process to build a specific query can be done based on prompts provided by server 136. Alternatively, to conserve bandwidth over wireless network 140, such prompts can be stored locally and made by the wireless device 130 or hands-free unit 132 to the user before the request is ever even sent to server 136. In this embodiment, it may be desirable to download scripts or prompts to wireless device 130 or hands-free unit 132 such that the latest in search criteria is available to the user. Preferably, however, larger amounts of data such as establishment locations, driving directions, etc. are stored at database 138 such that large amounts of storage are not needed with the wireless device 130 or hands-free unit 132. However, the distribution of data among these various devices can be made based on factors such as, for example, a cost benefit trade off considering storage costs at database 138 and locally within a wireless device and considering bandwidth and airtime costs across wireless network 140.

With the various applications of the invention, the user may also specify whether he or she wishes to avoid certain areas or parts of town that have a high crime rate, gang activity, drug trafficking activity, or other undesirable or dangerous reputation, or are otherwise reputed to be less desirable areas. For example, crime statistics can be received from law enforcement authorities or other sources and compiled in the database. Certain areas or neighborhoods can be identified as high-crime-rate areas, or other undesirable areas. the user may opt to avoid such areas and not receive choices for establishments in those areas, or not receive directions that will take the user through such areas on route to the establishment. This feature can be implemented automatically, or as an option selected by default or upon prompting of the user.

Alternatively, the system may provide an automatic warning sound or indication, alerting the user whether he or she is entering a high-crime-rate area. Such features are particularly useful where the user is unfamiliar with a particular area in which he or she is travelling.

Figure 3:
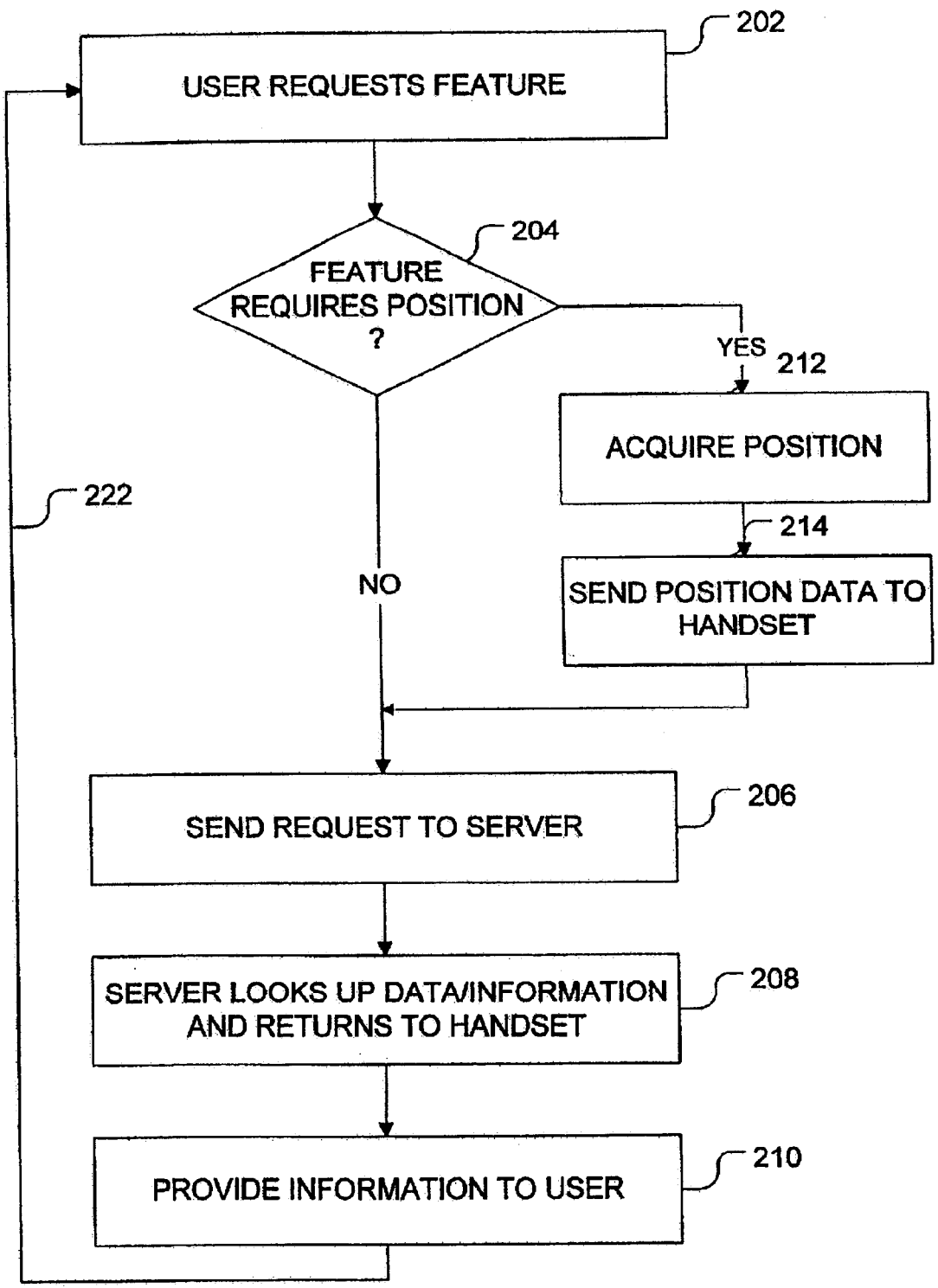
FIG. 3 is an operational flow diagram illustrating an example process for requesting information across a wireless network according to one embodiment of the invention.

FIG. 3 is an operational flow diagram illustrating an example process for requesting information across a wireless network 140. Referring now to FIG. 3, in a step 202, a user initiates a request for information. As stated above, this request can be made via a keypad entry or other keystroke on the device itself or, by voice commands in which the user audibly speaks his or her request and such request is recognized by a voice recognition system or circuitry. In a step 204, the system determines whether the feature requires position information. In one embodiment, where all information is based on positional information, this step can be eliminated, and it can be assumed that the request can only be fulfilled based on positional information. However, it is foreseeable that certain requests may be fulfilled based on either previous position information or can be fulfilled without position information, and as such this query may be made to avoid having to send such position information across wireless network 140.

In a step 212, position determination device 134 acquires the position of the wireless device. In one embodiment, the position determination acquisition is occurring somewhat constantly as long as the wireless device or hands-free unit is powered on. Thus, if position information is required, the most current information can be sent to server 136. In the embodiment illustrated in FIG. 2 where the position determination device is positioned in hands-free unit 132, the position data is provided to wireless device 130 for subsequent transmission to server 136 via wireless network 140. As such, in a step 214, the position data is provided to wireless device 130.

In a step 206, wireless device 130 sends the request to server 136 via wireless network 140. This request includes the position information or position data if required by the information requested, or if required to fulfill the information request. In a step 208, server 136 retrieves the data or information requested from database 138. Data may be retrievable and usable in raw form, or processing may be required to provide a product to the user. This can be based on the type of request made, the information requested, and the manner or format in which the information is stored in database 138.

As stated above, in one embodiment, scripts or other prompts may be provided back to the user to refine the information request. Such scripts can be stored on database 138 and retrieved by server in this step 208 and provided to the user in step 210. If this is the case, the user provides the requested information via wireless device 130 and the server uses this refined information to look up additional data or information in database 138, or to help refine the user's query. This is illustrated by flow line 222 and the repetition of steps 202, 206 and 208. In this repetition, updated position information may also be used depending on the amount of time elapsed and the distance traveled in that time.

As stated above, in one embodiment, some or all of the prompts for options for refining a request can be stored locally at device 130 or hands-free unit 132 such that the give and take of information required to build a refined request doesn't need to be provided across wireless network 140. In this embodiment, the repetition of information requests as illustrated by flow line 222 does not need to be followed, but instead occurs locally, preferably before the query is sent.

Once the request has been refined to the extent desired or possible, server 136 utilizes the refined request to retrieve the desired data from database 138. Continuing with the examples described above, server 136 may retrieve locational information for various restaurants, gas stations, hotels, or other facilities or services in the vicinity of the user's current location. A listing of these facilities or services that fit within the request can be provided back to the user via wireless network 140. This again is illustrated by step 210. As stated above, the information can be provided in audible form via a speech synthesizer or in textual form on a display. In one embodiment, the order in which the information is provided can be provided in a ranked priority order providing the best fits first to the user. In embodiments where the information is provided via audible voice information, this voice can be prerecorded or synthesized at server location 136 and provided as audio data across wireless network 140. Alternatively, the information can be sent across wireless network 140 as data and the speech synthesized vocally from this data.

Once the user selects a facility or service from the list of options provided, server 136 can retrieve or compute driving directions to the facility or service based on the user's current position. Again, if sufficient time has elapsed to significantly alter the user's current position, the server may request for a wireless device or hands-free unit may automatically provide an update on the position information as determined by position determination device 134.

In embodiments where speed of travel is provided as a parameter with the locational information, the determination of whether to update the position information can in part be made based on this parameter. Obviously, where the user is traveling at a higher rate speed, a shorter amount of time will elapse before an update in the position information affects the accuracy of the directions. Additionally, where the user is approaching a freeway exit or other waypoint in the route being computed, server 136 may request a position update to ensure that this waypoint has not been passed. If it has been passed, an alternative route is preferably calculated, or the route requests the user to backtrack to the passed waypoint. Thus, information such as speed of travel, time since original request, distance to first or subsequent way points, and other information can be used to determine whether the position information of the user needs to be updated in fulfilling the request.

Figure 4:
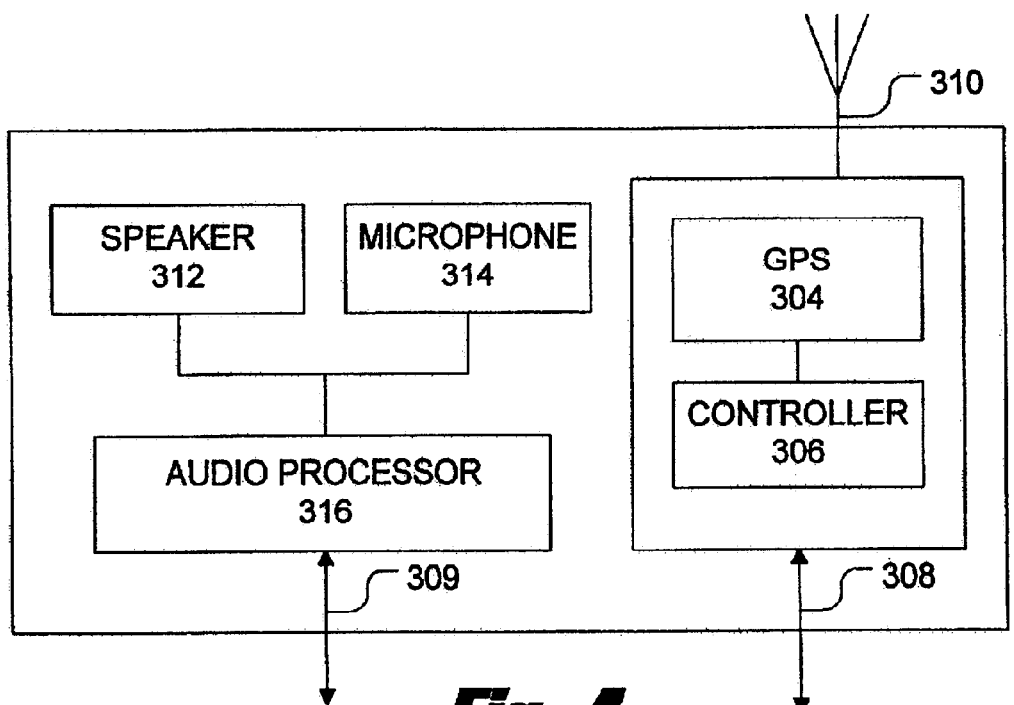
FIG. 4 is a functional block diagram illustrating an example implementation of a hands-free unit according to one embodiment of the invention.

As stated above, in one embodiment, position-determination device 134 is located in hands-free unit 132. FIG. 4 is a functional block diagram illustrating an example implementation of a hands-free unit 132 according to one embodiment of the invention. In the embodiment illustrated in FIG. 4, hands-free unit 132 includes as the position determination device 134 a GPS receiver 304 and an associated controller 306. As illustrated in FIG. 4, position information is exchanged with wireless device 130 via data in-out interface 308. Also illustrated in FIG. 4 is an antennae 310 utilized to allow GPS receiver 304 to communicate with the constellation of GPS satellites. As stated above, alternative position determination devices can be implemented.

Also illustrated in the embodiment of FIG. 4, are a speaker and microphone utilized to provide speakerphone-like capabilities to wireless device 130. In the embodiment illustrated in FIG. 4, an audio processor is included to provide A/D and D/A and echo canceling to digitize the voice or to provide audible voice from the digital data. Preferably, in one embodiment, the digitized voice is in the form of PCM (pulse code modulated) data, although other data coding techniques can be utilized.

As stated above, the system can include voice synthesis or voice recognition, or both, depending on the features and aspects implemented with the invention. Also as stated above, in one embodiment, the voice synthesis and recognition are provided in hands-free unit 132 although they could be provided in wireless device 130 or at server 136.

Figure 5:
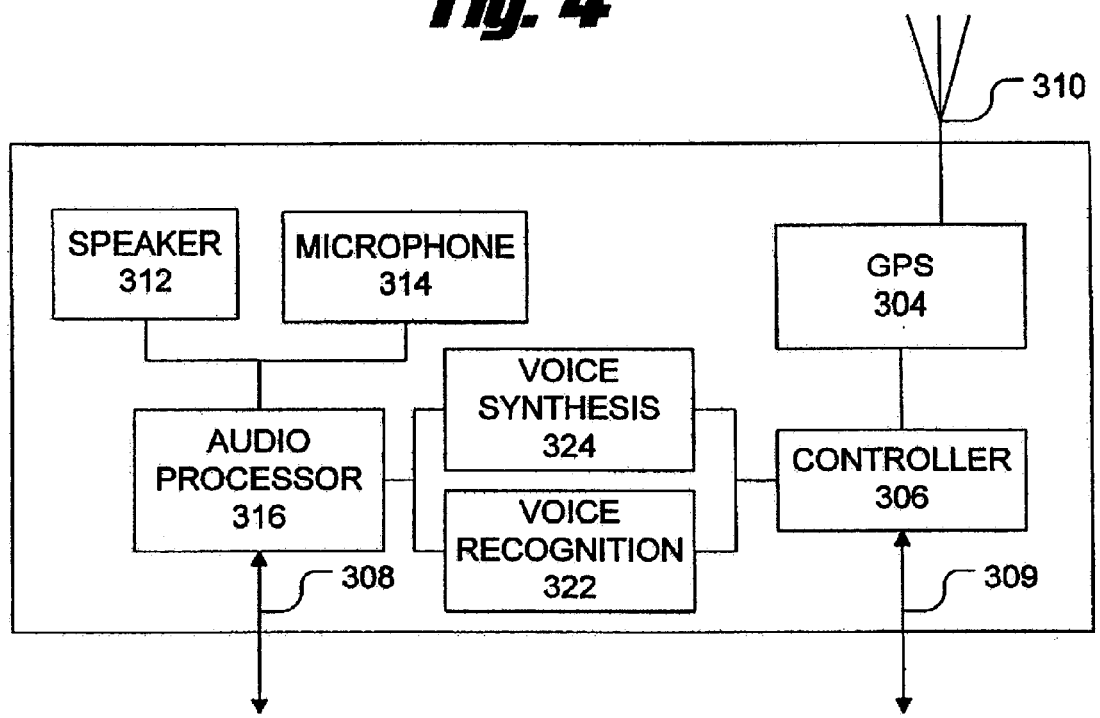
FIG. 5 is a functional block diagram illustrating an example implementation of a hands-free unit with voice synthesis and recognition according to one embodiment of the invention.

FIG. 5 is a functional block diagram illustrating an example implementation of a hands-free unit 132 with voice synthesis and recognition. In this embodiment, speech commands to operate the system as spoken by the user are received by microphone 314, digitized by audio processor 316 and run through a voice recognition algorithm 322. The recognized voice commands can be provided to controller 306 and sent to server 136 as data 308. Similarly, information retrieved by server 136 can be provided in data form received by controller 306 and provided to voice synthesizer 324. Voice synthesizer 324 converts this information to digital voice data, which is processed by audio processor 316 and played to the user via speaker 312. Additionally, audio information can be included via audio in-out communication path 309. Where speech synthesis or recognition is performed by server 136, digital voice is sent across network 140 and can be provided to or received from the user via audio in-out connection 309.

In one embodiment, where position determination device 134 is located in hands-free unit 132, wireless device 130 sends a location information request message to hands-free unit 132. Hands-free unit 132 in response sends a location information response message to the phone. The location information response includes parameters indicating the position, such as, for example, time, longitude, latitude, height, speed, and data age.

FIG. 6 is a diagram illustrating an example format for the location information request 404 and the location information response 408 according to one embodiment of the invention. As illustrated in the example implementation of FIG. 6, location information request 404 is a one byte data field. Response 408 includes in the illustrated embodiment several fields, including time 410, longitude 412, latitude 414, height 416, speed 418 and data age 420. In the illustrated embodiment, the time field 410 is six bytes in length, longitude field 412 is nine bytes in length, latitude 414 is eight bytes in length, height field 416 is eight bytes in length, speed field 418 is three bytes in length, and data age 420 is one byte in length. As would be apparent to one of ordinary skill in the art after reading this description, other lengths for the fields can be selected based on resolution required or the amount of data desired to be included with each parameter.

In one embodiment, the time is GPS time of day in seconds and is in ASCII format. In one embodiment, longitude, latitude and speed are also in ASCII format, with the longitude data being positive east, the latitude data being positive north and the speed being in miles per hour. In one embodiment, the data age reflects the age of the return data and can indicate whether the data is fresh, old, or otherwise not available. In one embodiment, data is listed as fresh if it is less than ten seconds of age, or old if it is greater than or equal to ten seconds. Of course, with these parameters 410 through 420, alternative formats can be provided and of course alternative time frames can be established for determining whether the data is fresh or old.

In some embodiments, a status request and response are used to query the status of position determination device 134 prior to requesting location information. This setup is particularly useful in applications where position determination device is a GPS receiver. In one example embodiment, the request message is one byte in length and simply requests a status of position determination device. In one example implementation, the response can include a one byte status word indicating whether the device is ready or not ready and can further be modified to include additional information such as, for example, a reason why the status is ready or not ready, or other information that may be pertinent to the situation.

Figure 7:
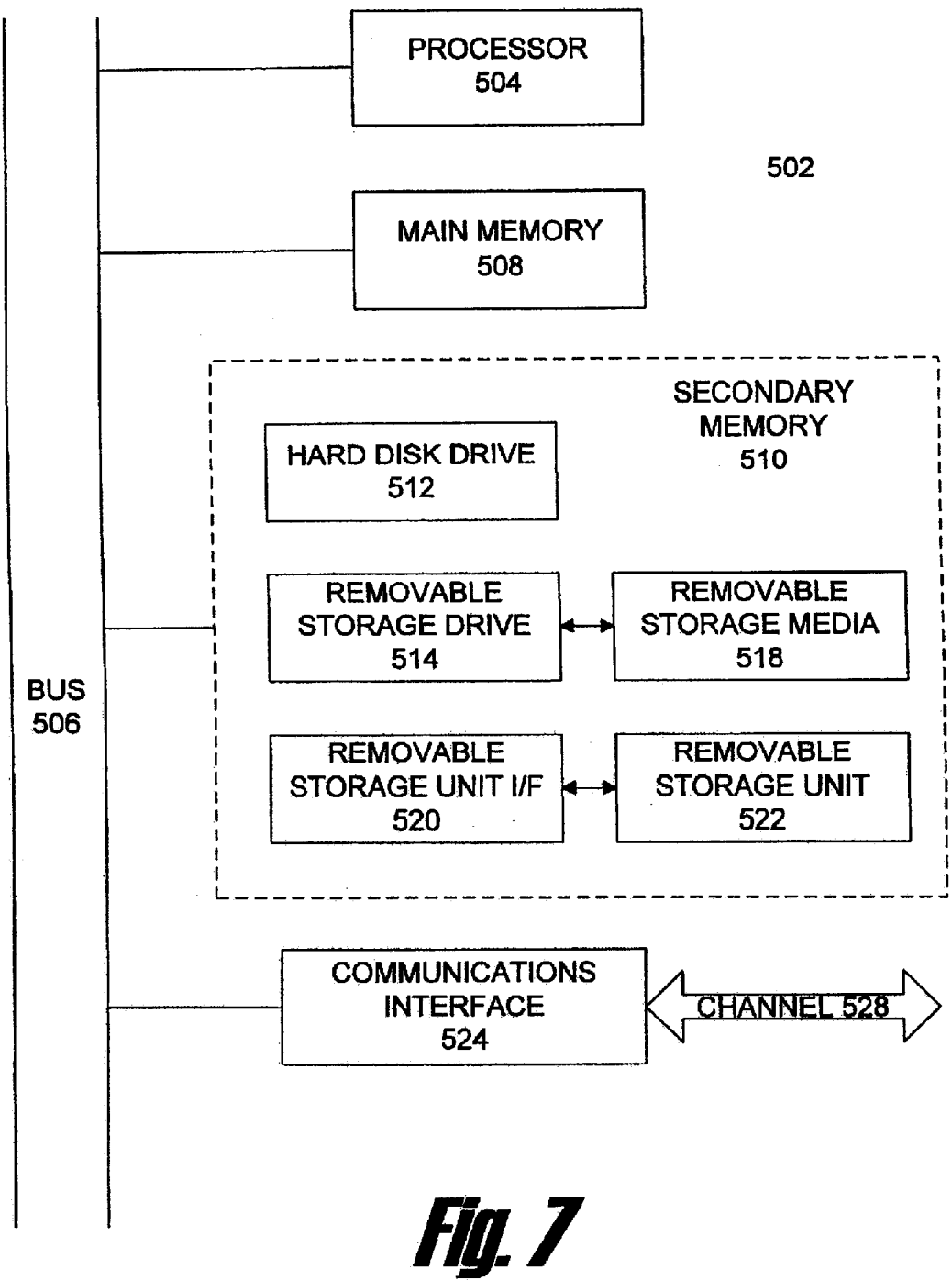
FIG. 7 is a diagram illustrating an example processor-based system according to one embodiment of the invention.

The various embodiments and features of the invention described above may be implemented using hardware, software or a combination thereof and may be implemented using a computing system having one or more processors. In fact, in one embodiment, these elements are implemented using a processor-based system capable of carrying out the functionality described with respect thereto. An example processor-based system 502 is shown in FIG. 7. The computer system 502 includes one or more processors, such as processor 504. The processor 504 is connected to a communication bus 506. Various software embodiments are described in terms of this example computer system. After reading this description, it will become apparent to a person skilled in the relevant art how to implement the invention using other computer or processor systems and/or architectures. The functionality of the invention as described above is not dependent on a particular computer or processor architecture.

Processor-based system 502 can include a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage medium 518 in a well known manner. Removable storage media 518, represents a floppy disk, magnetic tape, optical disk, etc. which is read by and written to by removable storage drive 514. As will be appreciated, the removable storage media 518 includes a computer usable storage medium having stored therein computer software and/or data.

In alternative embodiments, secondary memory 510 may include other similar means for allowing computer programs or other instructions to be loaded into computer system 502. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 502.

Computer system 502 can also include a communications interface 524. Communications interface 524 allows software and data to be transferred between computer system 502 and external devices. Examples of communications interface 524 can include a modem, a network interface (such as, for example, an Ethernet card), a communications port, a PCMCIA slot and card, etc. Software and data transferred via communications interface 524 are in the form of signals which can be electronic, electromagnetic, optical or other signals capable of being received by communications interface 524. These signals are provided to communications interface via a channel 528. This channel 528 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 518, a disk capable of installation in disk drive 512, and signals on channel 528. These computer program products are means for providing software or program instructions to computer system 502.

Computer programs (also called computer control logic) are stored in main memory and/or secondary memory 510. Computer programs can also be received via communications interface 524. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In an embodiment where the elements are implemented using software, the software may be stored in, or transmitted via, a computer program product and loaded into computer system 502 using removable storage drive 514, hard drive 512 or communications interface 524. The control logic (software), when executed by the processor 504, causes the processor 504 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A computer program product comprising a computer useable medium having computer program logic recorded thereon for enabling a processor in a computer system to request information based on locational information of a user, said computer program logic comprising:

computer program code means for accepting an information request from a user of a wireless communication device;

computer program code means, local to the user, that prompts the user, prior to a forwarding of the information request, to refine the information request prior to the accepting the information request;

computer program code means for determining locational information of said wireless communication device;

computer program code means for forwarding said information request and said locational information to a server via a wireless communications link;

computer program code means for receiving from said server a real-time, optimized response to said information request, wherein said server compiles said optimized response based on said locational information, said information request, and the refinement, and wherein said response is transmitted to said receiver without interaction from said user.

2. The computer program product of claim 1, wherein said information request can be made by the user via at least one of voice command or keypad entry.

3. The computer program product of claim 1, wherein said computer program code means for determining locational parameters is included with a hands-free unit coupled to the wireless communication device.

4. The computer program product of claim 1, wherein a response to said request for information is provided to the user as at least one of a visual display via a display device on said wireless communication device and voice information via said hands-free unit.

5. The computer program product of claim 1, wherein said location information comprises at least one of the group of latitude, longitude, elevation, speed of travel, time, and age of data.

* * * * *